United States Patent Office

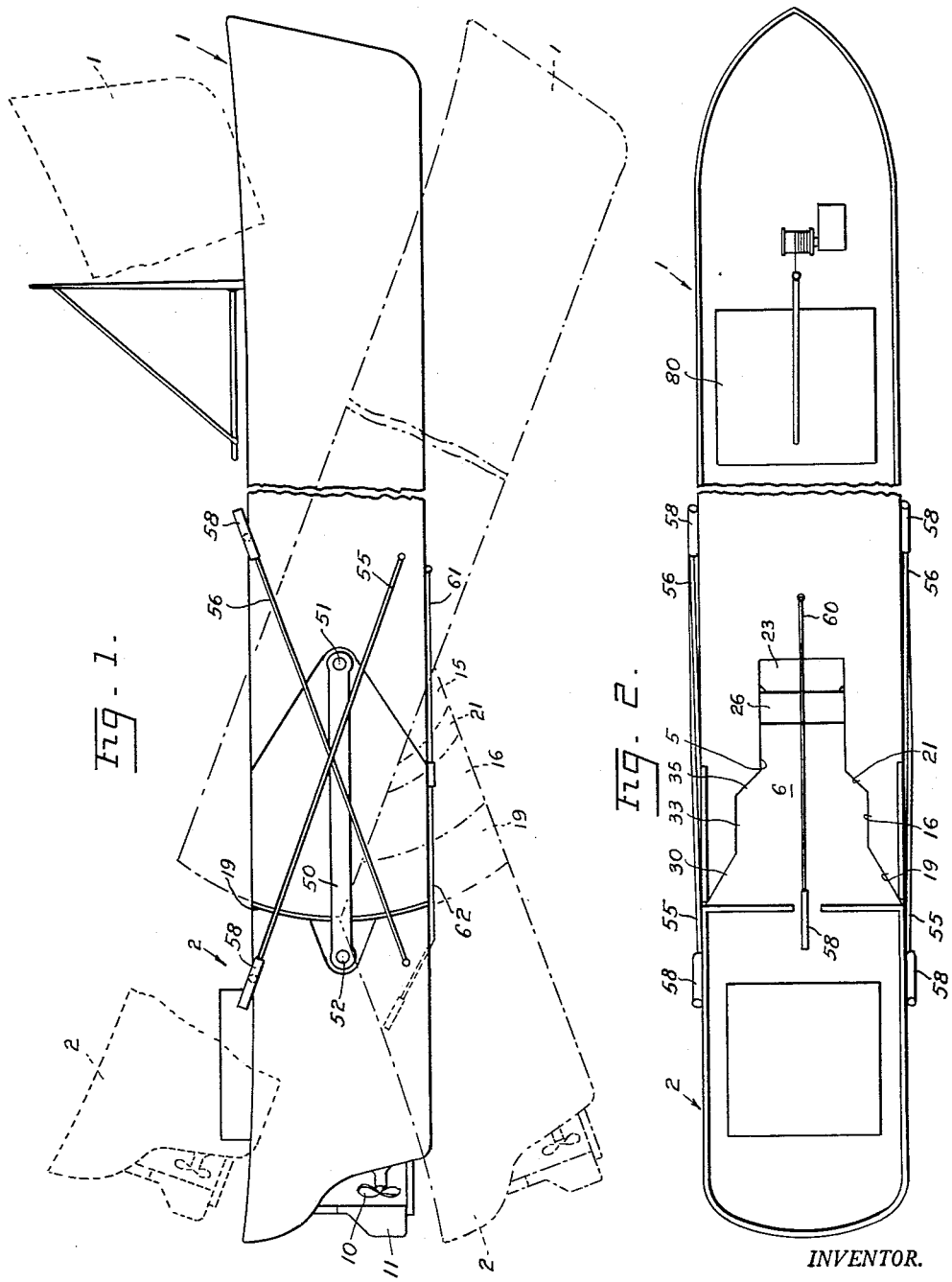

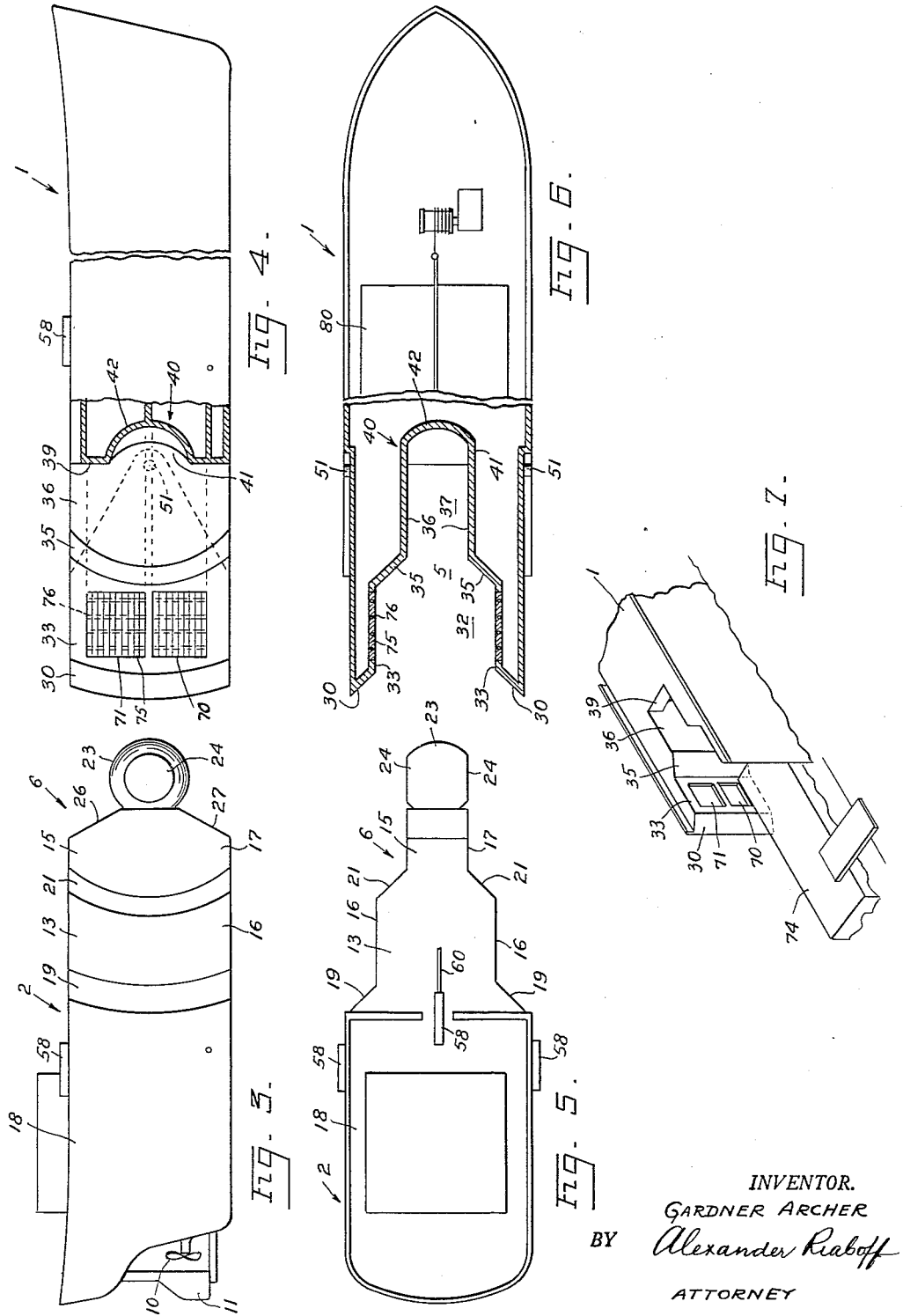

2,715,380
Patented Aug. 16, 1955

2,715,380
ARTICULATED SHIP
Gardner Archer, San Francisco, Calif.

Application March 4, 1952, Serial No. 274,771

9 Claims. (Cl. 114—77)

This invention relates to a ship and has for its object the provision of a ship consisting of two separate units: a cargo carrying unit and a power unit, which units when properly coupled, form a complete ship.

Another object of this invention is to provide a ship consisting of two separate units: a cargo carrying unit and a power unit, which units are so united between themselves as to provide a certain amount of controlled articulation therebetween.

Another object of this invention is to provide a ship of the type described in which a cargo carrying unit is formed with a well at the stern into which well the bow of the power unit is fitted and is connected thereto.

Another object of this invention is to provide a new connecting means between the two units, said means permitting certain controlled articulated motion therebetween, but excluding rolling and horizontal swinging of one unit in relation to the other.

Another object of this invention is to provide a cargo carrying unit of such design as to permit horizontal loading and unloading of that unit.

Other objects and advantages will appear as the specification proceeds and the novel features of the device will be particularly pointed out in the claims hereto annexed.

In this specification and the annexed drawing, the invention is illustrated in the form considered to be the best but it is understood, that the invention is not limited to such form; and it is also to be understood that in and by the claims following the description, it is desired to cover the invention in whatsoever form it may be embodied.

My invention is illustrated by the accompanying drawings forming a part of my specification in which:

Fig. 1 is a side elevation of a boat shown as consisting of two units.

Fig. 2 is a plan view of Fig. 1.

Fig. 3 is a side view of the power unit.

Fig. 4 is a side view shown partly in section of the cargo carrying unit.

Fig. 5 is a plan view of the power unit.

Fig. 6 is a plan view shown partly in section of the cargo carrying unit; and

Fig. 7 is a perspective view of the stern of the cargo unit, showing a loading operation of the unit.

In general a ship comprising the subject matter of this invention consists of two units: a cargo unit and a power unit. The purpose of the front cargo unit is to accept a cargo and carry the same. The purpose of the power unit is to act as a tug in relation to the cargo unit: to propel it to a point of destination.

The cargo unit is built with a well in its stern into which the bow of the power unit is adapted to enter, whereupon both units are connected by special connecting means permitting certain amount of controlled articulated motion of the units in relation to each other, but excluding rolling and horizontal swinging of one unit in relation to the other.

I also provide a novel means for loading and unloading the cargo unit: openings of the size more than sufficient to pass a truck are provided in the walls of the stern well in the cargo unit, which openings normally are carefully and securely closed. When a cargo unit is secured to a pier, and the power unit is removed, the openings in the walls of the well are opened firstly on the lower deck. A float is placed within the well which permits trucks to be driven from a pier on said float and therefrom on the lower deck of the unit. During the loading operation the cargo unit gradually settles. The opening, through which the trucks pass, is correspondingly gradually closed from the bottom. When the lower deck has been loaded and the lower opening has been closed the trucks are passed through an upper opening onto the upper deck.

In detail, my ship comprises a cargo unit 1 and a power unit 2, which pushes the first unit. The cargo unit 1 is of a general form of the front part of a cargo vessel, but it does not carry an engine, machinery and crew, and therefore, its structure is simpler and lighter than that of an ordinary cargo vessel. Its stern contains a well generally indicated at 5 into which the bow 6 of the power unit 2 is adapted to enter and be attached to the cargo unit 1. When both units are properly attached to each other they form a complete vessel of usual outline.

The power unit 2 contains an engine, machinery, crew and fuel, and it develops sufficient thrust to push the cargo unit 1 at a usual speed. When the cargo unit 1 is loaded or unloaded, the power unit 2 may be used for the purpose of propelling other cargo units, or may be repaired. It is believed that by dividing a ship into two separate units: cargo and power units, the usefulness of such ship is doubled.

The power unit 2 is a comparatively short part of the vessel and it is only large enough to house comfortably an engine, steering mechanism, various machinery, crew quarters, fuel and supplies. It has a usual propeller 10 and a rudder 11 at its stern. The bow 12 of the power unit includes two sections 13 and 15 having parallel sides 16 and 17 respectively. The section 13 is narrower than the main body 18 of the power unit 2, and a shoulder 19 is formed on each side to connect the main body 18 with the section 13. Another shoulder 21 is formed for connecting the section 13 with the considerably narrower section 15.

The latter section carries a disk 23, having two parallel sides 24. The width of the disk 23 is substantially the same as that of the section 15. The disk is located substantially in the middle between the bottom and the upper deck of the power unit 2. The front wall of the section 15 is inclined about 20° from said disk upwardly and backwardly as shown at 26, and downwardly and backwardly as shown at 27.

The well 5 of the cargo unit 1 is built to complement the bow 12 of the power unit 2. The very ends of said well are formed into the shoulders 30 and when both units are connected together, said shoulders 30 are separated from the shoulders 19 of the power unit by a very small distance. The section 13 fits snugly into a wide portion 32 of the well 5 so that the walls 16 of said section are in close proximity to the walls 33 of said portion 32. The walls 33 terminate with another pair of shoulders 35, which correspond to the shoulders 21 of the power unit. The walls 36 extend from the shoulders 35 into the ship and form a narrow portion 37 of the well 5, which portion accommodates snugly the section 15 of the power unit.

The front wall 39 of the narrow portion 37 is formed into a half circular thrust box 40 which admits snuggly the disk 23. The box 40 is formed by two flat side walls 41 which serve as a continuation of the walls 36 and by a half circular thrust wall 42. The latter is made of heavy metal capable of withstanding the pushing thrust of the power unit 1, as said thrust is transmitted to the cargo unit 1.

The disk 23 may be made hollow though necessarily with heavy walls and may contain an electric magnet therein which will help the disk 23 to stay in the box 40. The disk 23 may rotate in the box 40, or it may be withdrawn from said box. The disk 23 rotates in the box 40 when one unit swings upwardly or downwardly in relation to the other unit. This arrangement permits to minimize the forces developed by waves which tend to break the ship longitudinally into two or more parts. The ship which constitutes a subject matter of this invention, does not have to be of the strength of an ordinary ship. Its longer part, a cargo unit, is considerably shorter than the whole ship, and is also much lighter, as it does not carry an engine, machinery, fuel and crew quarters. Hence, the strength of an ordinary ship is not needed. The power unit is comparatively short and sturdy. By permitting one unit to oscillate in relation to the other about the center of said disk 23, it was made possible for the ship to follow, more or less, the outline of surface of water and, hence, to prevent the breaking force of waves from acting upon said ship.

The cargo unit 1 and the power unit 2 are connected by powerful connecting links 50, one end of each of which is fulcrumed to the cargo unit at 51 which is on a horizontal axis passing through the center of the disk 23, and the other end is fulcrumed to the power unit at 52. These links keep both units securely tied to each other, but at the same time permit one unit to oscillate vertically in relation to the other about the center of said disk.

Means are also provided on said ship for dampening the swinging of one unit in relation to the other unit, said means being shown in the drawings as cables 55 and 56, the first of which is attached below water line to the power unit 2 and the second to the cargo unit 1. The other ends of said cables are respectively attached to the cargo unit 1 and the power unit 2 through hydraulic jacks, or other yieldable means, shown at 58. A cable 60 is also arranged on the upper deck of the ship, one end of which cable is attached to said cargo unit and the other through same yieldable means 58 to the power unit. Another cable 61, if so desired, may be arranged on the bottom of the ship. One end of said cable is permanently attached to the cargo unit and the other end to a light cable, not shown on the drawings, by which it can be pulled above the water. The other cable 62 is arranged on the bottom of the power unit and has on its end attached thereto a light cable by which said end also may be pulled above the surface of the water. When both ends are pulled out of the water, they are coupled by any known devices carried on said ends. Then the cable 62 is tightened by pulling it inside of the power unit 2 and kept yieldably tight during the trip. The cables 55, 56, 60, 61 and 62 work to decrease the vertical articulation of the ship, because any swinging of one unit in respect to the other pulls some of the cables, which in turn operate hydraulic jacks 58, thus dampening said swinging. When one unit swings vertically in relation to the other, it tends to pull the other unit upwardly or downwardly. Thus the weight of the unit acts as a factor in stabilizing the units horizontally. To release the power unit 2 from the cargo unit 1, the links 50 and the cables 55, 56, 60, 61 and 62 have to be disconnected, whereupon the power unit backs slowly away from the cargo unit.

New means are provided for loading or unloading the cargo unit 1. An opening 70 is provided in each wall 33 of the well section 32 on the lower deck and a similar opening 71 is also provided in said walls on the upper deck, both openings extending from one deck to the other. Similar openings may also be provided in the walls 36. In order to load said cargo unit, a float, or a barge 74 is brought into the well 5, and the lower opening 70 is opened. The cargo unit 1, or the barge 74 are made to change its level so that the deck of the barge and the lower deck of the cargo unit are substantially of the same level. Then loaded trucks are brought from a pier onto the barge 74 and therefrom through said opening 70 onto the lower deck of the cargo unit. The cargo is thus delivered directly to a place where it shall be stored during this trip. When the cargo unit 1 settles the opening 70 is closed gradually from the bottom up, and trucks continue to enter the lower deck as long as there is enough vertical clearance for them to pass. Some support is used to permit trucks to descend from the closure to the deck. Many means may be employed for gradually closing the opening 70, and it is shown in the drawing as consisting of heavy timbers or plastic battons 75 extending across said opening and connected to the deck and to each other by joined rods 76. Said timbers 75 are placed one upon the other and the rods 76 are extended by screwing a lower end of a rod into an upper end of a rod in the timbers until the whole opening is closed. To make such closure watertight, the same is covered with plastic, or some other method of waterproofing the closure is applied.

When the opening 70 is closed the loading operation proceeds through the upper opening 71 in the same manner.

A separate hatch 80 may be provided on the upper deck of the cargo unit 1 for loading the unit after further loading through the opening 71 becomes impossible.

I claim:

1. An articulated ship comprising an independent cargo carrying unit, and an independent power unit for pushing the cargo carrying unit; the latter unit having a well in the stern thereof; a section formed in the bow of the power unit for entering said well when both units are joined; means for transmitting the pushing thrust of the power unit to the cargo carrying unit including an element carried by the front end of said section and a thrust box carried by said cargo carrying unit in the front part of said well for admitting said element with freedom of limited rotation therein to permit articulation of one unit in regard to the other and means for holding both units together.

2. An articulated ship consisting of an independent cargo carrying unit and an independent power unit; parallel vertical walls in the stern of the cargo carrying unit located symmetrically in relation to the central vertical plane of said unit, and a front wall connecting said parallel walls to form an open well in the stern of said cargo carrying unit; parallel vertical walls in the bow of said power unit located symmetrically in relation to the central vertical plane of said power unit forming a section thereof snugly fitting the well of the cargo carrying unit when both units are joined together, means carried by said section for transmitting the pushing thrust of the power unit to the cargo unit, said means permitting said power unit to oscillate in relation to the cargo unit, said power unit being of substantially the same width as the cargo unit and located back of the latter except said section which fits into the well, and means for joining the two units together.

3. An articulated ship consisting of an independent cargo carrying unit and an independent power unit; parallel walls in the stern of the cargo unit located symmetrically in relation to the central vertical plane of said unit, and a front wall connecting said parallel walls to form an open well in the stern thereof; parallel walls in the bow of the power unit located symmetrically in relation to the central vertical plane of the latter unit forming a section fitting snugly the well of the cargo carrying unit when both units are joined together; means carried by said section for transmitting the pushing thrust of the power unit to the cargo carrying unit, said means including a disk carried by the front end of said section, said disk having two parallel sides; a thrust box in the front wall of the well for admitting said disk thereinto, said box consisting of two parallel vertical sides and a half circular thrust wall.

4. An articulated ship consisting of an independent cargo carrying unit and an independent power unit; parallel walls in the stern of the cargo unit located symmetrically in relation to the central vertical plane of said unit, and a front wall connecting said parallel walls to form an open well in the stern thereof; parallel walls in the bow of the power unit located symmetrically in relation to the central vertical plane of the latter unit forming a section fitting snugly the well of the cargo carrying unit when both units are joined together; means carried by said section for transmitting the pushing thrust of the power unit to the cargo carrying unit, said means including a disk carried by the front end of said section, said disk having two parallel sides; a thrust box in the front wall of the well for admitting said disk thereinto, said box consisting of two parallel vertical sides and a half circular thrust wall, and bars for holding said units together, one end of each bar being connected to said cargo unit at a place located on a horizontal axis passing through the center of said disk, and the other ends to the power unit.

5. An articulated ship consisting of an independent cargo carrying unit and an independent power unit; parallel walls in the stern of the cargo unit located symmetrically in relation to the central vertical plane of said unit, and a front wall connecting said parallel walls to form an open well in the stern thereof; parallel walls in the bow of the power unit located symmetrically in relation to the central vertical plane of the latter unit forming a section fitting snugly the well of the cargo carrying unit, when both units are joined together; means for transmitting the pushing thrust of the power unit to the cargo unit, said means located substantially in the central vertical plane and near the middle of the height of the cargo carrying unit, said means permitting vertical articulation of both units about a horizontal axis passing through said means, and means for holding both units together.

6. An articulated ship consisting of an independent cargo carrying unit and an independent power unit; parallel walls in the stern of the cargo unit located symmetrically in relation to the central vertical plane of said unit, and a front wall connecting said parallel walls to form an open well in the stern thereof; parallel walls in the bow of the power unit located symmetrically in relation to the central vertical plane of the latter unit forming a section fitting snugly the well of the cargo carrying unit when both units are joined together; means for transmitting the pushing thrust of the power unit to the cargo unit, said means permitting vertical articulation of both units about a horizontal axis passing through said means, and a pair of bars, holding said units together, one end of each bar being connected to said cargo carrying unit at a place located on said horizontal axis and the other ends to power unit.

7. An articulated ship consisting of an independent cargo carrying unit and an independent power unit; parallel walls in the stern of the cargo unit located symmetrically in relation to the central vertical plane of said unit, and a front wall connecting said parallel walls to form an open well in the stern thereof; parallel walls in the bow of the power unit located symmetrically in relation to the central vertical plane of the latter unit forming a section fitting snuggly the well of the cargo carrying unit when both units are joined together; means for transmitting the pushing thrust of the power unit to the cargo unit, said means permitting vertical articulation of both units about a horizontal axis passing through said means, a pair of bars, holding said units together, one end of each bar being connected to said cargo carrying unit at a place located on said horizontal axis and the other ends to power unit, and means for dampening the articulation of said units.

8. An articulated ship comprising an independent cargo carrying unit, and an independent power unit for pushing the cargo carrying unit; the latter unit having a well in the stern thereof; a section formed in the bow of the power unit for entering said well when both units are joined; means for transmitting the pushing thrust of the power unit to the cargo carrying unit including a disk carried by the front end of said section, and a thrust box carried by the cargo carrying unit for admitting said disk thereinto, said box consisting of two parallel sides and a half circular thrust wall, said means permitting articulation of one unit in regard to the other and means for holding both units together.

9. A ship construction including an inclosed cargo carrying unit, said inclosure comprising a bottom, a deck and sides and having a well open at the bottom and top in one end of said unit, said well defined by spaced generally parallel substantially vertical side walls extending to and through the bottom upwardly to and through said deck, and end wall means joining said side walls and said bottom and deck, the spacing of said side walls being such as to receive cargo and loading means therefor, at least one of said generally vertical walls formed to provide a plurality of vertically spaced openings whereby cargo may be placed in said unit at different levels via said means and openings, and means for sealing said openings.

References Cited in the file of this patent

UNITED STATES PATENTS

| | | |
|---|---|---|
| 60,471 | Cahoon | Dec. 18, 1866 |
| 1,304,318 | Jackson | May 20, 1919 |
| 1,363,039 | Gussi | Dec. 21, 1920 |

FOREIGN PATENTS

| | | |
|---|---|---|
| 314,095 | Germany | Aug. 27, 1919 |
| 555,525 | Great Britain | Aug. 26, 1943 |